United States Patent
Pasala et al.

(10) Patent No.: US 10,049,032 B2
(45) Date of Patent: *Aug. 14, 2018

(54) METHODS FOR GENERATING A NEGATIVE TEST INPUT DATA AND DEVICES THEREOF

(71) Applicant: Infosys Limited, Bangalore (IN)

(72) Inventors: Anjaneyulu Pasala, Bangalore (IN); Nihar Sharma, Bangalore (IN); Saurav Singh, New Delhi (IN)

(73) Assignee: Infosys Limited, Bangalore (IN)

(*) Notice: Subject to any disclaimer, the term of this patent is extended or adjusted under 35 U.S.C. 154(b) by 767 days.

This patent is subject to a terminal disclaimer.

(21) Appl. No.: 14/560,766

(22) Filed: Dec. 4, 2014

(65) Prior Publication Data
US 2015/0301927 A1    Oct. 22, 2015

(30) Foreign Application Priority Data
Dec. 20, 2013    (IN) .......................... 5995/CHE/2013

(51) Int. Cl.
*G06F 9/44* (2018.01)
*G06F 11/36* (2006.01)

(52) U.S. Cl.
CPC ................ *G06F 11/3684* (2013.01)

(58) Field of Classification Search
CPC ................................. G06F 11/3684
See application file for complete search history.

(56) References Cited

U.S. PATENT DOCUMENTS

| | | | |
|---|---|---|---|
| 5,913,023 A * | 6/1999 | Szermer | G06F 11/3676 714/38.1 |
| 6,928,393 B2 | 8/2005 | Czerwonka | |
| 7,926,114 B2 | 4/2011 | Neystadt et al. | |
| 8,302,080 B2 * | 10/2012 | Wassermann | G06F 8/00 717/131 |
| 2006/0010426 A1 | 1/2006 | Lewis et al. | |
| 2006/0031718 A1 | 2/2006 | Thornhill et al. | |
| 2010/0037210 A1* | 2/2010 | Okada | G06F 11/3414 717/125 |

(Continued)

OTHER PUBLICATIONS

Srivastava P., et al., "Application of Genetic Algorithm in Software Testing" International Journal of Software Engineering and Its Applications, vol. 3, No. 4, Oct. 2009, pp. 1-10.

(Continued)

*Primary Examiner* — Hang Pan
(74) *Attorney, Agent, or Firm* — LeClairRyan PLLC

(57) ABSTRACT

The present invention provides a method and system for generating negative test input data. A set of attributes and a set of attribute properties can be extracted from a requirement specification. A constraint representation syntax can be framed from the extracted set of attribute properties. A structured diagram is modeled from the framed constraint representation syntax and a set of use cases, a set of path predicates can be constructed from the structured diagram. One or more attribute classes can be determined from the set of path predicates based on an attribute constraint and an attribute dependency. The negative test input data shall be generated from the one or more attribute classes using genetic algorithm.

24 Claims, 5 Drawing Sheets

(56) References Cited

U.S. PATENT DOCUMENTS

2011/0016451 A1* 1/2011 Gorthi ................ G06F 11/3684
717/124
2012/0254665 A1* 10/2012 Pasala ................ G06F 11/3684
714/33

OTHER PUBLICATIONS

Andrews J., et al., "Genetic Algorithms for Randomized Unit Testing" IEEE Transactons on Software Engineering, vol. 1, No. 1, Jan. 2001, pp. 1-15.
Srivastava P., "Optimization of Software Testing Using Genetic Algorithm", Information Systems, Technology and Management, 2009, pp. 350-351.

* cited by examiner

METHODS FOR GENERATING A NEGATIVE TEST INPUT DATA AND DEVICES THEREOF

This application claims the benefit of Indian Patent Application Serial No. 5995/CHE/2013 filed Dec. 20, 2013, which is hereby incorporated by reference in its entirety.

FIELD

The present invention relates generally to a method and system for verifying functionality of an application. More specifically, the present invention relates to a method and system for generating a negative test input data for testing a functionality of an application.

BACKGROUND

A typical commercial business application must be able to handle a situation when a non-compliant user presents invalid data to the application. In order to determine how the application behaves in such a scenario, it may be essential to provide a tester of the application with a comprehensive set of conditions which need to be handled by appropriate exception messages and a set of negative test input data respectively to verify the exception messages. Providing the set of negative test input data to the application usually discovers existing bugs in the application and the application's fault tolerance capabilities.

Techniques for generating negative test input data automatically for an application exist in prior art. For instance, an evolutionary search and model based test data generation technique is currently used in commercial organizations for generating the negative test input data for testing the application. In another instance, Genetic Algorithm (GA) can be used for creating positive test input data that satisfy stipulated properties of software attributes and input fields of the application. Further, while specification models provide attribute properties, techniques for generating the negative test input data for string data is currently unavailable. Hence there is a need for a method for generating the negative test input fata for an attribute from a specification model, where the attribute maybe of a string, numeric, or character type.

The alternate system and method must automate generation of the negative test input data from the requirements specifications model. Existing attributes and a set of properties of the attributes shall be extracted from the requirements specifications model, for automatically generating negative test input data along with test scenarios. Thus a system and method for automatic generation of the negative test input data from given requirements specifications model of an application is proposed.

SUMMARY

The present invention provides a method and system for generating negative test input data. In accordance with a disclosed embodiment, the method may include extracting a set of attributes and a set of attribute properties from— requirements specification. Further, the method shall include framing constraint representation syntax from the extracted set of attribute properties and modeling a structured diagram from the framed constraint representation syntax and a set of use cases. A set of path predicated shall be constructed from the modeled structured diagrams. One or more attribute classes from the set of path predicates shall be determined based on an attribute constraint and an attribute dependency. Finally, the negative test input data for the determined one or more attribute classes can be generated.

In an additional embodiment, a computer program product for generating negative test input data. In accordance with a disclosed embodiment, the computer program product may include extracting a set of attributes and a set of attribute properties from requirements specification. Further, the computer program product shall include framing constraint representation syntax from the extracted set of attribute properties and modeling a structured diagram from the framed constraint representation syntax and a set of use cases. A set of path predicates shall be constructed from the modeled structured diagrams. One or more attribute classes from the set of path predicates shall be determined based on an attribute constraint and an attribute dependency. Finally, the negative test input data for the determined one or more attribute classes can be generated.

These and other features, aspects, and advantages of the present invention will be better understood with reference to the following description and claims.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Figure 1:
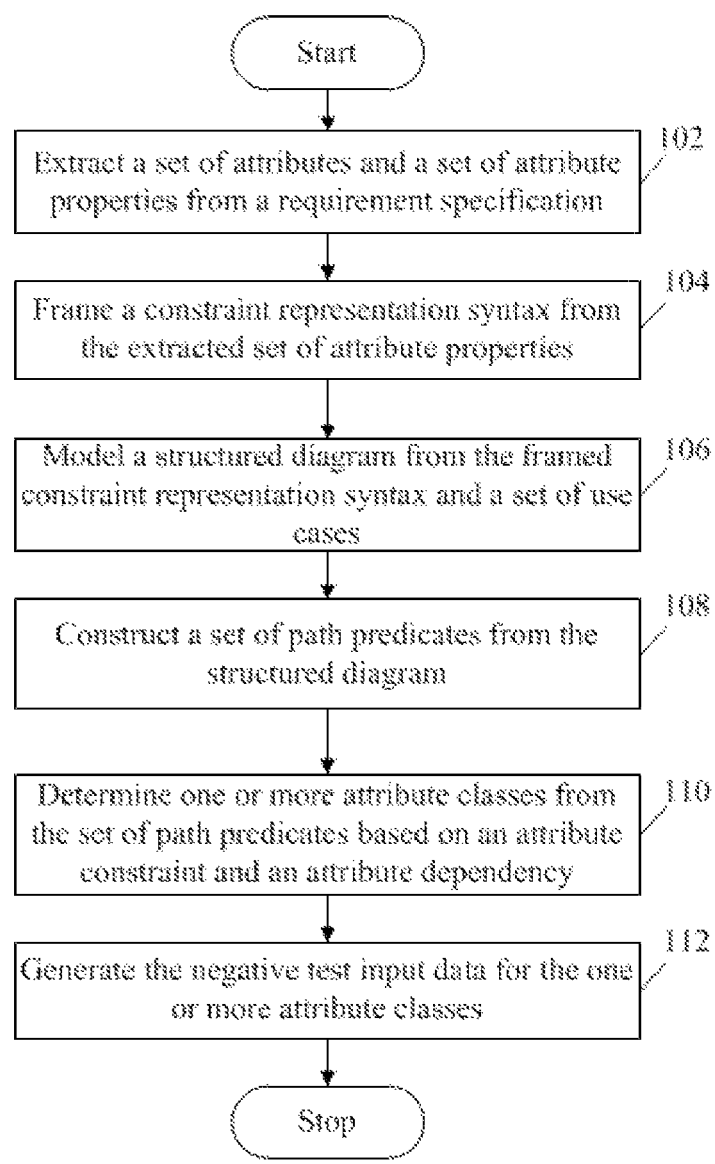
FIG. 1 is a flowchart illustrating an embodiment of a method for generating negative test input data.

FIG. 1 is a flowchart that illustrates a method for generating negative test input data of an application in accordance with an embodiment of the invention. In order to generate positive test input data or negative test input data of the application, each system attribute and a set of attribute properties of the each system attribute needs to be identified. A system attribute is usually an input given to an application, and the test input data is a possible set of values the system attribute can take. At step 102, a set of attributes and a set of attribute properties can be extracted from a requirement specification such as a software requirements specifications document. The each system attribute and the set of attribute properties thus extracted are in a textual form, composed in a natural language that a computing machine may not understand. Hence it is essential for converting the textual form into a machine readable format, and at the same time representing the textual form in a constraint representation syntax (CRS) for further processing. At step 104, the CRS can be framed from the extracted set of attribute properties. For instance, a requirement of choosing a password while entering an internet banking application, may require satisfying a set of properties such as: the password must be alphanumeric, the password must have a minimum of eight characters and a maximum of twelve characters, the password must have at least two numeric characters, and one special character form a permissible set of ($, @, #) and the first character must be an alphabet. The aforesaid properties of the password attribute define constraints or attribute properties of the password attribute. However, the attribute properties are expressed in the natural language or the textual form. The CRS of the attribute properties of the password can be expressed by following a general structure of a constraint expression in the CRS. The general structure of the constraint expression is:

Attribute Constraint =<Type_ID>[<length_ID>, <positional_ID>, <inclusion_char_set>, <non-inclusion_char_set>, <nested_constraints>]

In the general structure, <Type ID> defines a type of an attribute. The type of the attribute can be alphabetic, alphanumeric, string, numeric and the like. The type of the attribute can be identified by a type identifier. In an instance, a plurality of types of the attributes can be expressed in Table 1, as:

TABLE 1

The Type of the attribute and the Type Identifier

| Type Identifier | Description |
| --- | --- |
| A | Alphanumeric string types |
| C | Character string, alphabets only |
| CC | Character string, uppercase alphabets |
| CS | Character string, lowercase alphabets |
| N | Numeric or Number type |
| S | Special Characters allowed in the alphanumeric strings |
| D | Date type |

In the Table 1, the type identifier specified by N, the numeric type identifier, can be used to specify both integer and float data types. For a positive integer, N[x] is used, where x is the number of digits in the attribute's numeric value. Hence, N[2] may imply a number with two digits. For negative integers '−N [x]' can be used. Floating point numbers can be specified as N[x, y] where x and y represent number of digits before and after the decimal point respectively. A numeric value range can be specified as N[x-y]. Further, the type identifier S, may refer to a string attribute.

Further, <length_ID> provides the range or permissible number of characters in attribute values. The range can be specified as a [Min-Max] pair. In the instance of the password attribute, [8-12] implies that a number of characters should be a minimum of 8 and a maximum of 12 characters in length. A fixed length of the attribute can be represented by a single number. The <positional_ID>, can refer to a specific character set required to be present at a particular position. The <positional_ID> can be represented with 'p' followed by an arrow sign (->) and the specific character set. For example, 'p1->R' indicates that character 'R' should be at the first position. Character ranges can also be provided to the positional identifier. For example, p1->(A-z,a-z) specifies that only an alphabetical character can be at the first position. The <inclusion_char_set> identifier implies the permissible set of characters. The syntax can be an 'i' followed by a comma separated list of permissible characters enclosed in brackets. Character ranges may also be permitted in order to specify a set of permissible characters. For example, 'i(#,$,*,&)' may refer to the set of permissible characters. Similarly, the <non-inclusion_char_set> identifier means the specified set of characters should not be part of data being generated. The syntax can be similar to the syntax of the <inclusion_char_set> identifier except 'ni' maybe used instead of 'i'. The <nested_constraints> identifier, refers to constraints specified with in a constraint predicate. For example, in a constraint attribute <C> A[8-12, N[1-2]], the A[8-12, . . . ] is the main constraint, whereas N[1-2] is the nested or inner constraint. Multiple nested or inner constraints can be specified for an attribute and properties of the attribute.

At step 106, the CRS and a set of use case behavior can be utilized for modeling a structured diagram such as a Use Case Activity Diagram (UCAD). Initially the set of use cases of the application must be identified, every use case functionality or behavior can be further decomposed into a sequence of 'units of behavior'. A unit of behavior can be a specific functional interaction between a user and a system, consisting of a user input, a set of system processes, a set of conditions, and a system output. A plurality of unit of behaviors can be modeled using the UCAD. In the UCAD, the constraints can be part of decisions, represented by conditional nodes. The attribute properties can be represented in the conditional nodes using the CRS. A generic manner of representation of the constraint of the attribute can be:

Attribute_name <C> attribute_properties_in_constraint_syntax, where <C> means contains. For instance constraints on the password attribute maybe expressed as: password <C> A[8-12,p1->[A-Z, a-z], N[2], S[1,i(#, $, *, &)]]

At step 108, a set of path predicates can be constructed from the UCAD. A Depth First Search maybe conducted in order to extract all paths of the UCAD. Each path may comprise f a set of nodes connected sequentially in a directional flow of the path. The conditional nodes of the path, representing the attribute properties, maybe framed into the set of path predicates. A path predicate can be constructed by aggregating the constraints present in the path with a logical AND combination.

Consider an instance of a web application where a user can create a user account. The user maybe prompted to enter his name and age. On verifying the age to be above eighteen years, the web application may expect an alphanumeric UserID and a password to be chosen. In an event specified attributes get satisfied, the web application may permit the user towards registration. In an event an invalid input is provided by the user, the web application may throw an appropriate exceptional message. A use case behavior for the given instance can be modeled as shown in FIG. 4.

Figure 4:
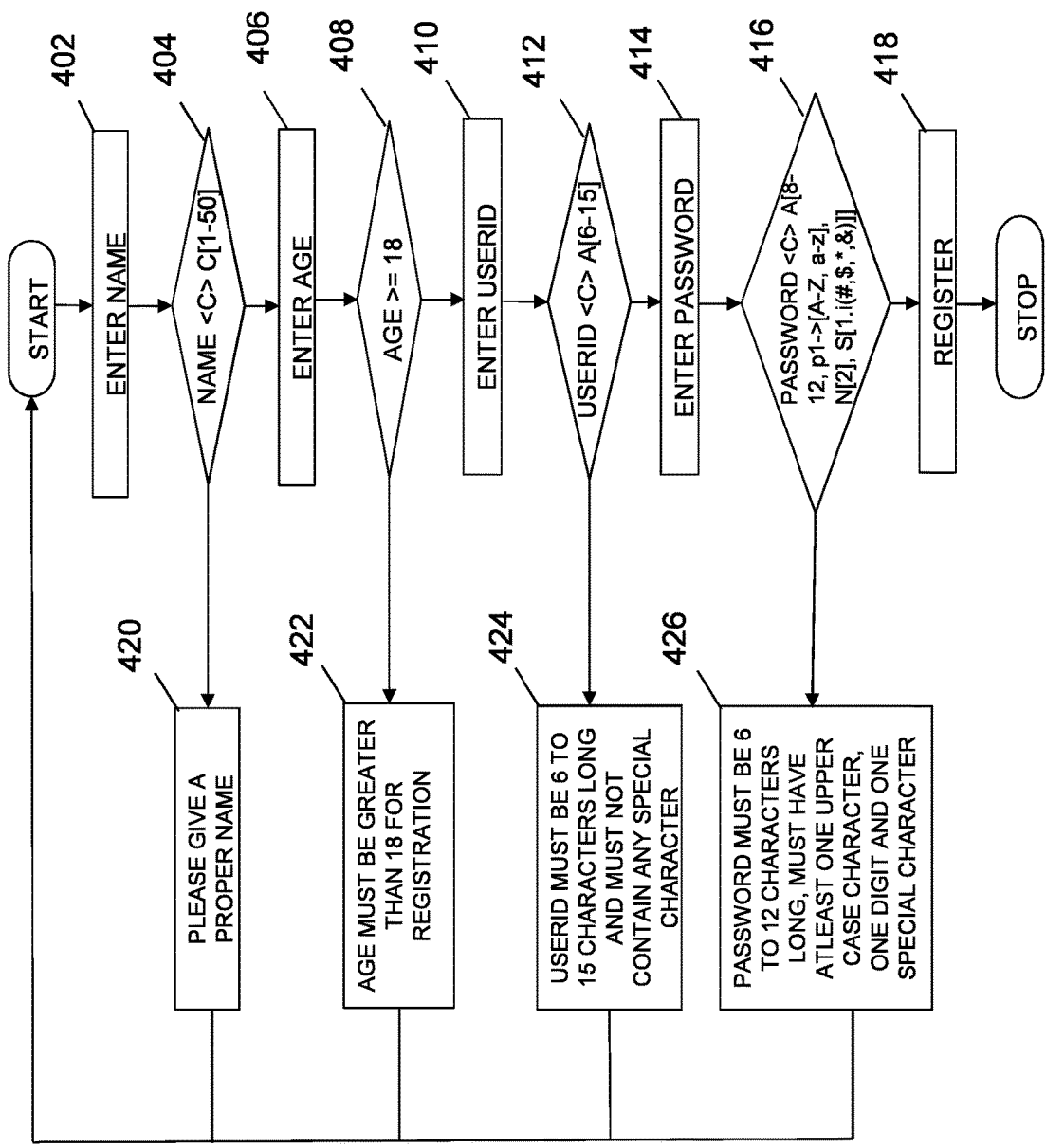
FIG. 4 is an exemplary flowchart illustrating a use case behavior.

A longest path from the UCAD as shown in FIG. 4, can be extracted to have a predicate as:

Name<C>C[1-100]=Yes, Age>18=Yes, UserID<C>A[6-15]=Yes, Password<C>A[8-12,p1->[A-z,a-z], N[2], S[1,i(#, $,*,&)]]=Yes.

On extracting the set of path predicates, the attributes maybe identified by a constraint syntax parser. At step 110, based on the attribute constraint and an attribute dependency, the set of path predicates can be analyzed for determining one or more attribute classes. In the disclosed embodiment, the one or more attribute classes may include a string attribute class, a numeric attribute class with boundary constraints, and a numeric attribute class with relational constraints. The string attribute class may include character data governed by a set of properties that need to be met. The string attribute can be identified by the presence of the constraint representation syntax to represent string properties. The numeric attribute class with boundary constraints usually includes Boolean comparisons against specific values. For instance, if a path gives a following predicate X>10=Yes, where X is a numeric attribute, with a boundary condition of being greater than 10, then the attribute class associated with such path is the numeric attribute with boundary constraints. Further, if a path predicate is represented as:

X>10=Yes AND Y<20=YES AND X<100=Yes AND Z>0=NO AND Y+Z<10=Yes then, as X, Y and Z have boundary conditions, and Y and Z are related by a relational constraint Y+Z<10=Yes, the attribute class associated is the numeric attribute class with relational constraints.

Finally at step 112, negative test input data shall be generated for the one or more attribute classes that are extracted from the path predicates. On the UCAD, the data which fails to meet the constraints specified in the CRS, can be considered as the negative test input data. An advantage of the negative test input data is to cover alternate functionalities that increase a functional coverage. In the given instance, if the Age attribute has a value less than 18 years, then an exception is thrown "Age must be greater than 18 years". Hence, in the instance, the negative data for the Age attribute is <18. Further, the type of the attribute usually has a predefined format. A value that does not conform to the format may lead to format violation. Negative data that meet violations of the format of the attribute and specified range value, can be instrumental in determining whether attribute verification and respective error handling mechanism of software has been properly incorporated or not. Hence negative data can be helpful in evaluating fault tolerance capabilities of software.

Figure 2:
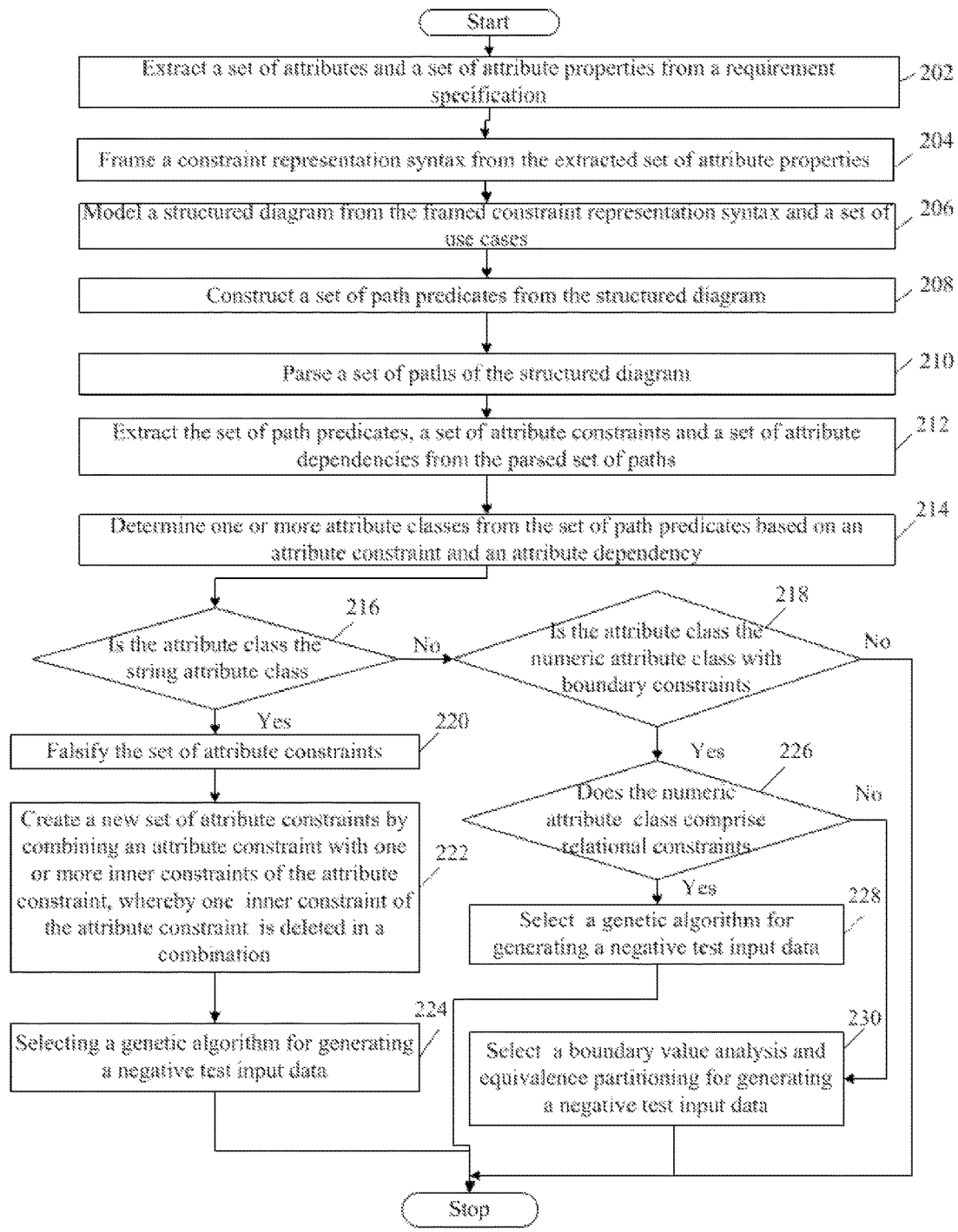
FIG. 2 is a flowchart illustrating a preferred embodiment of a method for generating negative test input data.

FIG. 2 illustrates an alternate embodiment of a method of practicing the present invention. At step 202, a set of attributes and a set of attribute properties can be extracted from a requirement specification such as a software requirements specifications document. The each system attribute and the set of attribute properties thus extracted are in a textual form, composed in a natural language that a computing machine may not understand. It is essential for converting the textual form into a machine readable format, and at the same time representing the textual form in a constraint representation syntax (CRS) for further processing. Hence at step 204, the CRS is framed from the extracted set of attribute properties. At step 206, a structured diagram such as a use case activity diagram (UCAD), can be modeled from the framed CRS and a set of use case behaviors. Further, at step 208, a set of path predicates can be extracted from the UCAD, by following a set of paths. At step 210, each of the set of paths can be parsed on the UCAD. At step 212, a set of path predicates, a set of attribute constraints, and a set of attribute dependencies, shall be extracted from the parsed set of paths. Based on the set of attribute constraints and the set of attribute dependencies, of the set of path predicates, one or more attribute classes can be determined at step 214. The one or more attribute classes can be a string attribute class, a numeric attribute class with boundary constraints, or a numeric attribute class with relational constraints.

Figure 5:
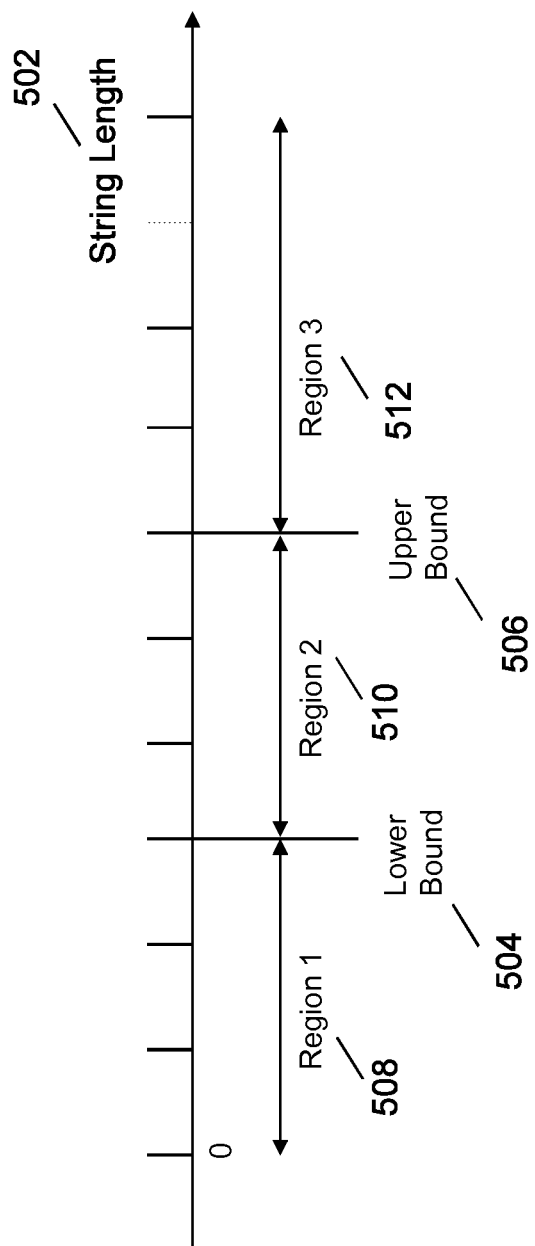
FIG. 5 is an exemplary illustration of line graph representing a three regions.

At step 216, if the attribute class is verified to be of the string attribute class, a negative test input data for the string attribute class shall be generated by a generation algorithm known as a genetic algorithm. Attribute properties of the string attribute can be broadly classified in two categories, namely a length property and a content and structural property. Any data value that does not satisfy either the length or a structural based property is considered as the negative test input data. In order to achieve the negative test input data, a number of negative strings shall be calculated based on a length of the string. The negative string data can be divided in three parts based on the length. A first part also known as a less than lower bound part, being data values, with a length less than a lower bound of the length specified in the attribute constraint, a second part, known as a within bounds part, being data values with a length within bounds of the length specified in the constraint, and a third part, known as a more than upper bound part, being data values with a length larger than an upper bound of the length specified in the attribute constraint. The three parts can be represented on a length graph as illustration in FIG. 5.

The less than lower bound part can be represented as a region 1, the within bounds part can be represented as a region 2, and the more than upper bounds part can be represented as a region 3. A Boundary Proximity Weightage (BPW) method can be used for determining a number of negative string values required based on the length of the string. A 'N' number of the negative test input data can be specified to be generated across all three regions. Consider, N1, N2, and N3 can be a number of string values to be generated in the region 1, the region 2 and the region 3 respectively. In an instance, the N number of negative test input data can be divided uniformly among the three regions as N1=N2=N3=N/3. There could be several exceptions to the division. Further, each region may have multiple string lengths, for instance, region 2 can accommodate string of lengths l, l+1, l+2, . . . , u−1 and u. In order to determine a number of negative data values to be generated for each length, for all the regions, approaches well established in prior art maybe deployed. In an approach, for calculation of number of data values (Nsol) for a given string length L from the region 1, following equation may be used:

$$N_{sol}(L) = K\left(\frac{1}{e^{l-L}}\right) \qquad \text{Equation 1}$$

where K is an empirical constant. As N1 is a number of negative test input data from the region 1, a summation over all string lengths of region 1 must total to N1;

$$\sum_{L=0}^{l-L} N_{sol}(L) = N_1, \qquad \text{Equation 2}$$

$$K\left(\frac{1}{e^0} + \frac{1}{e^1} + \frac{1}{e^2} + \ldots + \frac{1}{e^{l-1}}\right) = N_1$$

or $$K\left(\frac{1-\frac{1}{e^l}}{1-\frac{1}{e}}\right) = N_1$$

Solving the Equation 2, we can get an appropriate value of K for N1. Similar procedure may be applied for the region 3. However, for the region 2, as each string length has an equal chance of being selected, a number of data values with respect to each string length need not be determined. A GA based data generation that randomly selects lengths from the region 2, while creating an initial population by the length properties specified in the attribute constraint can be utilized.

Further, the attribute constraints need to be modified for generating realistic negative data values. At step 220, the set of attribute constraints can be falsified. In a process of falsifying the set of attribute constraints, a new set of attribute constraints can be created by combining an attribute constraint with one or more inner constraints of the attribute constraint, whereby one inner constraint of the attribute constraint is deleted in a combination, at step 222. Once the new set of attribute constraints are created, they can be used for generating the negative test input data by a genetic algorithm, at step 224. The Genetic Algorithm (GA) is an optimization technique well-known in art. The GA may iteratively determine a series of constraints by a concept of fitness value. Initially a random set of negative string input data, referred to as an initial population of individuals, shall be generated. A fitness value of each individual of the initial population shall be determined, where the fitness value is directly proportional to a number of constraints the individual satisfies. A selected number of best fit individuals shall be selected for a cross-over process, to create a new set of individuals. Initial set of individuals along with the new set of individuals shall be carried forward to form a next candidate population. The next candidate population can be shrunk to a size of the initial population by a process of eliminating least fit individuals. Individuals, present in the shrunken population can be subjected to a process of mutation, succeeded with the cross-over process. An individual, with a highest fitness value, that satisfies the series of constraints can be selected as a candidate solution extraction, and added to a solution set. Aforementioned process can be iteratively repeated till a required number of candidate solutions are generated.

However, if at step 218, and step 226 the attribute class, is verified to be of the numeric attribute class with boundary constraints, a boundary value analysis and an equivalence partitioning method shall be followed for generating the negative data. In the boundary value analysis method, each conditional node of the UCAD, that results in a 'No' label, of a path predicate, and which involves only boundary conditions and no relational constraints, shall be reversed and the label shall be changed to 'Yes'. As a result, the objective changes to generation of data through boundary value analysis that satisfy all the comparisons, in the new predicate. If at the step 226, the attribute class is verified to be of the numeric attribute class with relational constraints, at step 228, a genetic algorithm shall be utilized for generating the negative test input data. In the genetic algorithm approach, each attribute can be extracted from a path predicate having relational constraints. Based on a number of attributes extracted, an individual vector size can be determined. An initial population can be created by random generations, after the individual vector size is determined. If a size of the initial population is 'n', then 'n' vectors can be created each of size 'm', and every vector shall be populated randomly with numbers. Further, the conditional nodes, present in the path predicate can be segregated based on an outcome of a label. The attribute constraints that have a Yes label, are placed in a yes_set and the attribute constraints that have a No label are placed in a no_set. The initial population, shall be processed by the genetic algorithm, for generating a first test input data. The genetic algorithm usually extracts a highest fit individual in every cycle from the initial population and marks, it as a candidate solution. In order to calculate a fitness of the individual, on the path predicate, involving the yes_set, corresponding elements from the vectors are placed in the condition expression and a truth value is computed. In an event the condition evaluates to true, then the fitness of the individual can be incremented by one. If the attribute data value leads to a false outcome in the no_set, then the fitness value can be incremented by one. A sorted list of individual in an order of decreasing fitness maybe presented for candidate solution extraction and cross-over selection.

Figure 3:
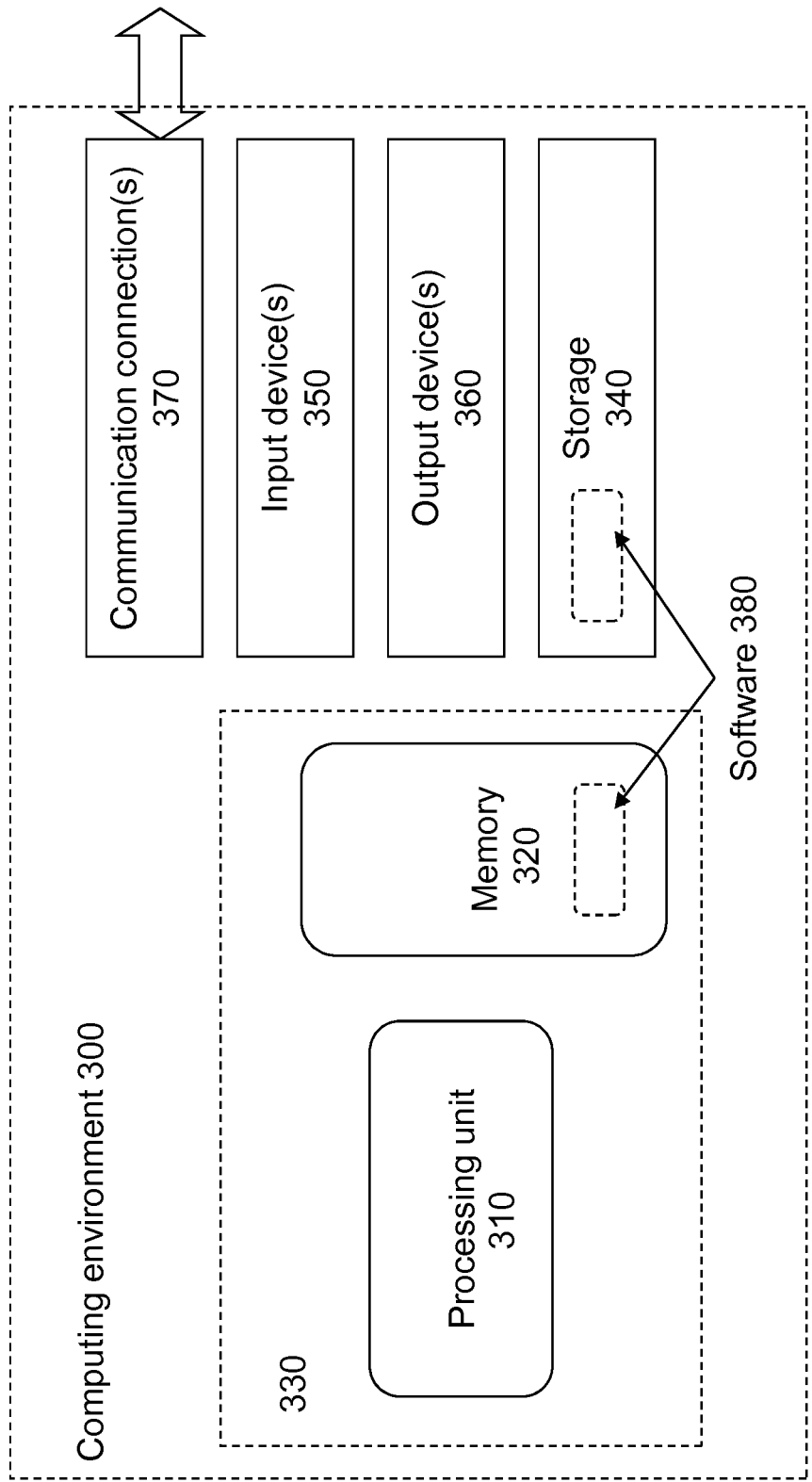
FIG. 3 illustrates a generalized example of a computing environment 300.

One or more of the above-described techniques can be implemented in or involve one or more computer systems. FIG. 3 illustrates a generalized example of a computing environment 400. The computing environment 400 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 340, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which can be used to store information and which can be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications, and examples of the subject matter disclosed herein may be made. It is intended by the following claims to cover the various implementations, modifications, and variations that may fall within the scope of the subject matter described.

What is claimed is:

1. A method of generating a negative test input data, the method comprising:
   extracting, by a data management device, a set of textual attributes and a set of textual attribute properties from a requirement specification;
   framing, by the data management device, a constraint representation syntax from the extracted set of attribute properties;
   modeling, by the data management device, a structured diagram from the framed constraint representation syntax and a set of use cases;
   constructing, by the data management device, a set of path predicates from the structured diagram;
   determining, by the data management device, one or more attribute classes from the set of path predicates based on an attribute constraint and an attribute dependency;
   generating, by the data management device, the negative test input data for the one or more attribute classes; and
   executing, by the data management device, the generated negative test input data to test a model of an application.

2. The method of claim 1, wherein the attribute class comprises a string attribute class, a numeric attribute class with boundary constraints, or a numeric attribute class with relational constraints.

3. The method of claim 2, wherein determining the one or more attribute classes further comprises:
   parsing, by the data management device, a set of paths of the structured diagram; and
   extracting, by the data management device, the set of path predicates, a set of attribute constraints, and a set of attribute dependencies from the parsed set of paths.

4. The method of claim 3, wherein generating the negative test input data further comprises:
   selecting, by the data management device, a generation algorithm based on the attribute class.

5. The method of claim 4, wherein the numeric attribute class with relational constraints comprises at least one of the set of attribute dependencies.

6. The method of claim 4, wherein generating the negative test input data further comprises:
   falsifying, by the data management device, the set of attribute constraints; and
   creating, by the data management device, a new set of attribute constraints by combining an attribute constraint with one or more inner constraints of the attribute constraint, whereby one inner constraint of the attribute constraint is deleted in a combination, when the attribute class is the string attribute class.

7. The method of claim 1 further comprising:
   identifying, by the data management device, an attribute test data as the negative test input data when the attribute test data complies negatively with an attribute constraint of a path predicate.

8. The method of claim 7, wherein the generation algorithm comprises a genetic algorithm when the attribute class is the string attribute class, a boundary value analysis and equivalence partitioning when the attribute class is the numeric attribute class with boundary constraint, and a genetic algorithm when the attribute class is the numeric attribute class with relational constraints.

9. A data management computing device comprising:
   a processor; and
   a memory coupled to the processor which is configured to be capable of executing programmed instructions comprising and stored in the memory to:
   extract a set of textual attributes and a set of textual attribute properties from a requirement specification;

frame a constraint representation syntax from the extracted set of attribute properties;

model a structured diagram from the framed constraint representation syntax and a set of use cases;

construct a set of path predicates from the structured diagram;

determine one or more attribute classes from the set of path predicates based on an attribute constraint and an attribute dependency;

generate the negative test input data for the one or more attribute classes; and execute the generated negative test input data to test a model of an application.

10. The device of claim 9, wherein the attribute class comprises a string attribute class, a numeric attribute class with boundary constraints, or a numeric attribute class with relational constraints.

11. The device of claim 10, wherein determining the one or more attribute classes further comprises:

parsing a set of paths of the structured diagram; and extracting the set of path predicates, a set of attribute constraints, and a set of attribute dependencies from the parsed set of paths.

12. The device of claim 11, wherein generating the negative test input data further comprises:

selecting a generation algorithm based on the attribute class.

13. The device of claim 12, wherein the numeric attribute class with relational constraints comprises at least one of the set of attribute dependencies.

14. The device of claim 12, wherein generating the negative test input data further comprises:

falsifying the set of attribute constraints; and creating a new set of attribute constraints by combining an attribute constraint with one or more inner constraints of the attribute constraint, whereby one inner constraint of the attribute constraint is deleted in a combination, when the attribute class is the string attribute class.

15. The device of claim 9, wherein the processor coupled to the memory is further configured to be capable of executing additional programmed instructions comprising and stored in the memory to:

identify an attribute test data as the negative test input data when the attribute test data complies negatively with an attribute constraint of a path predicate.

16. The device of claim 15, wherein the generation algorithm comprises a genetic algorithm when the attribute class is the string attribute class, a boundary value analysis and equivalence partitioning when the attribute class is the numeric attribute class with boundary constraint, and a genetic algorithm when the attribute class is the numeric attribute class with relational constraints.

17. A non-transitory computer readable medium having stored thereon instructions for generating a negative test input data comprising executable code which when executed by a processor, causes the processor to perform steps comprising:

extracting a set of textual attributes and a set of textual attribute properties from a requirement specification;

framing a constraint representation syntax from the extracted set of attribute properties;

modeling a structured diagram from the framed constraint representation syntax and a set of use cases;

constructing a set of path predicates from the structured diagram;

determining one or more attribute classes from the set of path predicates based on an attribute constraint and an attribute dependency;

generating the negative test input data for the one or more attribute classes; and executing the generated negative test input data to test a model of an application.

18. The medium of claim 17, wherein the attribute class comprises a string attribute class, a numeric attribute class with boundary constraints, or a numeric attribute class with relational constraints.

19. The medium of claim 18, wherein determining the one or more attribute classes further comprises:

parsing a set of paths of the structured diagram; and extracting the set of path predicates, a set of attribute constraints, and a set of attribute dependencies from the parsed set of paths.

20. The medium of claim 19, wherein generating the negative test input data further comprises:

selecting a generation algorithm based on the attribute class.

21. The medium of claim 20, wherein the numeric attribute class with relational constraints comprises at least one of the set of attribute dependencies.

22. The medium of claim 20, wherein generating the negative test input data further comprises:

falsifying the set of attribute constraints; and creating a new set of attribute constraints by combining an attribute constraint with one or more inner constraints of the attribute constraint, whereby one inner constraint of the attribute constraint is deleted in a combination, when the attribute class is the string attribute class.

23. The medium of claim 17 further comprising executable code which when executed by a processor, causes the processor to perform steps further comprising:

identifying an attribute test data as the negative test input data when the attribute test data complies negatively with an attribute constraint of a path predicate.

24. The medium of claim 23, wherein the generation algorithm comprises a genetic algorithm when the attribute class is the string attribute class, a boundary value analysis and equivalence partitioning when the attribute class is the numeric attribute class with boundary constraint, and a genetic algorithm when the attribute class is the numeric attribute class with relational constraints.

* * * * *